United States Patent [19]

Anderson et al.

[11] Patent Number: 5,220,525

[45] Date of Patent: Jun. 15, 1993

[54] RECODED ITERATIVE MULTIPLIER

[75] Inventors: William C. Anderson; Ajay Naini, both of Austin, Tex.

[73] Assignee: Motorola, Inc., Schaumburg, Ill.

[21] Appl. No.: 787,477

[22] Filed: Nov. 4, 1991

[51] Int. Cl.[5] .............................................. G06F 7/52
[52] U.S. Cl. ..................................................... 364/760
[58] Field of Search .............................. 364/759–760, 364/736, 754

[56] References Cited

U.S. PATENT DOCUMENTS

| | | | |
|---|---|---|---|
| 4,546,446 | 10/1985 | Machida | 364/759 |
| 4,575,812 | 3/1986 | Kloker et al. | 364/760 |
| 4,752,905 | 6/1988 | Nakagawa et al. | 364/760 |
| 4,831,577 | 5/1989 | Wei et al. | 364/760 X |
| 4,965,762 | 10/1990 | Williams | 364/760 |
| 5,001,661 | 3/1991 | Corleto et al. | 364/754 X |

OTHER PUBLICATIONS

IBM Tech. Disclosure Bull., vol. 27, No. 11, Apr. 1985, pp. 6624–6632, "Improved Approach to the Use of Booth's Multiplication Algorithm".

"High-Speed Monolithic Multipliers for Real-Time Digital Signal Processing" written by Shlomo Waser and published in IEEE Computer in Oct. 1978, pp. 19–29.

Primary Examiner—Tan V. Mai
Attorney, Agent, or Firm—Jonathan P. Meyer

[57] ABSTRACT

A recorded iterative multiplier (20) performs an unsigned multiplication operation quickly and with a minimal amount of added circuitry. Multiplier (20) includes a Modified Booth recoder (34) and a plurality of multiplexors (24, 26, 28, 30, and 32) to provide a plurality of partial products. An additional partial product typically generated during a first iteration of the multiplication operation is provided to a multiplexor (44) and a remaining portion of partial products are provided to a summation tree (40) having a symmetrical circuit layout. [Multiplexor (44) stores the additional partial product until summation tree (40) has processed the remaining partial products to provide a first sum.] When summation tree (40) has processed the remaining partial products to provide a first sum, multiplexor (44) provides the additional partial product to a carry save adder (42). The first sum is added to the additional partial product in [a carry-save] adder (42) to provide a first portion of a product. During a second iteration of the multiplication operation, an additional partial product is not generated, and summation tree (40) provides the second portion of the multiplication product. The first and second portions are then summed in carry-save adder (42) to provide the multiplication product.

12 Claims, 2 Drawing Sheets

8 #6 #4 #2
S 15 14 13 12 11 10 9 8 7 6 5 4 3 2 1 Ø
7 #5 #3 #1

RECODED SIGNED MULTIPLIER

8 #6 #4 #2 #0
Ø 16 15 14 13 12 11 10 9 8 7 6 5 4 3 2 1 Ø Ø
7 #5 #3 #1

RECODED UNSIGNED MULTIPLIER

1

RECODED ITERATIVE MULTIPLIER

FIELD OF THE INVENTION

This invention relates generally to digital multipliers, and more particularly to recoded iterative multipliers.

BACKGROUND OF THE INVENTION

As data processing systems become more complex, multipliers are required to execute multiplication operations for operands with more bits in a shorter amount of time. As the number of bits in the operands increases, the number of partial products used to form a multiplication product is also increased. Correspondingly, the amount of circuitry required to implement the multiplier and the time required to execute the multiplication operation are also proportionally increased.

One method for increasing the speed with which a multiplier performs a multiplication operation implements a recoding algorithm, such as a Modified Booth's algorithm, to reduce a number of partial products generated to form the multiplication product. By using the Modified Booth's algorithm, a signed multiplication operation is accomplished using half of the previously required number of partial products. An unsigned multiplication operation generates one more partial product than the signed multiplication operation. In Modified Booth's algorithm, a multiplier operand is segmented into sections of three bits. Each one of the three-bit sections is encoded to form a set of control signals. In turn, each one of the control signals enables a logic circuit, such as a multiplexor, to perform a predetermined operation on a multiplicand operand. For the Modified Booth's algorithm, the predetermined operation may be a multiplication by either a zero, a positive or negative one, or a positive or negative two. A more detailed description of the Modified Booth's algorithm may be found in U.S. Pat. No. 4,575,812 entitled "X×Y Bit Array Multiplier/Accumulator Circuit" by Kloker et al. and assigned to the assignee hereof.

The Modified Booth's algorithm provides a method for performing a multiplication operation more quickly and with less logic circuitry than conventional methods. In addition to increasing the speed of the multiplication operation, multiplier circuits are also required to multiply operands which have an increased number of bits. To compensate for the increasing number of bits and still maintain a minimum amount of circuit area, iterative multiplier circuits have been developed. An iterative multiplier reuses a substantial portion of its circuitry to perform a multiplication operation. During a multiplication operation, an iterative multiplier performs a first iteration of the multiply operation and accumulates a first result. The iterative multiplier then performs one or successive iterations of the multiply operation and adds the first result to a plurality of successive results to iteratively form a product. Because each iteration of the iterative multiplication operation uses the same multiplier circuitry, the increased bit width of the operands does not substantially increase the circuit area. Therefore, when implementing a multiplier which uses both the Modified Booth's algorithm and the iterative multiplier circuit, a multiplication operation with larger operands may be performed using a minimal circuit area.

For example, during a signed multiplication operation in which the operands have word sizes which are integral powers of two bits (e.g. 8, 16, 32), The Modified Booth's algorithm typically generates a plurality of partial products, the number of which is also a power of two. This set of partial products may be efficiently summed in a symmetrical circuit layout referred to as a binary summation tree. The binary nature of the word sizes generally results in a symmetric summation tree which allows the signed multiplication operation to be performed with a significant increase in speed. However, during an unsigned multiplication operation, an extra partial product is generated. Therefore, the summation tree must be implemented in an asymmetric configuration to compensate for a number of partial products which is not a power of two. The asymmetrical circuit layout is not easily implemented in an iterative multiplier. The asymmetrical circuit detracts from both the speed performance of the signed multiplication and the circuit area required to implement a multiplier which performs unsigned multiplication operations.

Although an iterative multiplier which implements the Modified Booth's algorithm provides improvements over other conventional multipliers, a need exists for a multiplier to perform unsigned multiplication operations more efficiently. The speed at which the unsigned multiplication operation is performed should be increased without a loss of circuit area. Additionally, the number of components required to implement the unsigned multiplication operation should be minimized.

SUMMARY OF THE INVENTION

The previously mentioned needs are fulfilled with the present invention. Accordingly, there is provided, in one form, a circuit and method for providing a recoded iterative multiplier. The recoded iterative multiplier has a first input means for receiving and storing a multiplier operand. The first input means selectively provides only portions of the multiplier operand at any one point in time. The multiplier also has a recoder coupled to the first means. The recoder receives a predetermined portion of the multiplier operand and provides a plurality of recoded control signals in accordance with a predetermined recoding algorithm. The multiplier has a second input means for receiving and providing a multiplicand operand. The recoded iterative multiplier has partial product generation means coupled to the second input means and the recoder, for providing a plurality of summands by shifting and selectively negating the multiplicand operand a predetermined number of bit positions in response to the recoded control signals. A means for reducing the plurality of summands is coupled to the partial product generation means for reducing the plurality of summands to a smaller number of summands. The multiplier has a means for combining the smaller number of summands with two input signals to provide two intermediate summands and a means for selecting either a predetermined one of the plurality of summands when expressed in a redundant form or the two intermediate summands as an output and coupling the output to the means for combining as the two input signals. An output adder means is coupled to the means for combining for receiving the two intermediate summands and adding the two intermediate summands to provide an output product.

These and other features, and advantages, will be more clearly understood from the following detailed description taken in conjunction with the accompanying drawing.

DETAILED DESCRIPTION OF A PREFERRED EMBODIMENT

In a first form, the present invention provides a recoded iterative multiplier which performs an unsigned multiplication operation more efficiently and without added circuitry typically required by conventional multiplier implementations. The recoded iterative multiplier is able to manipulate the additional partial product generated during an unsigned multiplication operation such that the multiplication operation is efficiently executed using both an iterative circuit design and the Modified Booth's algorithm.

When Modified Booth's algorithm is used to perform a signed multiplication operation, a signed multiplier operand is segmented into predetermined sections of three bits. Each of the predetermined sections is then recoded to form a single signal which is subsequently used to provide an intermediate summand. The intermediate summands of each of the predetermined sections are summed to form a multiplication product. The format for recoding a signed multiplier operand using a Modified Booth's algorithm is illustrated in FIG. 1A.

Figures 1A, 1B, 3:
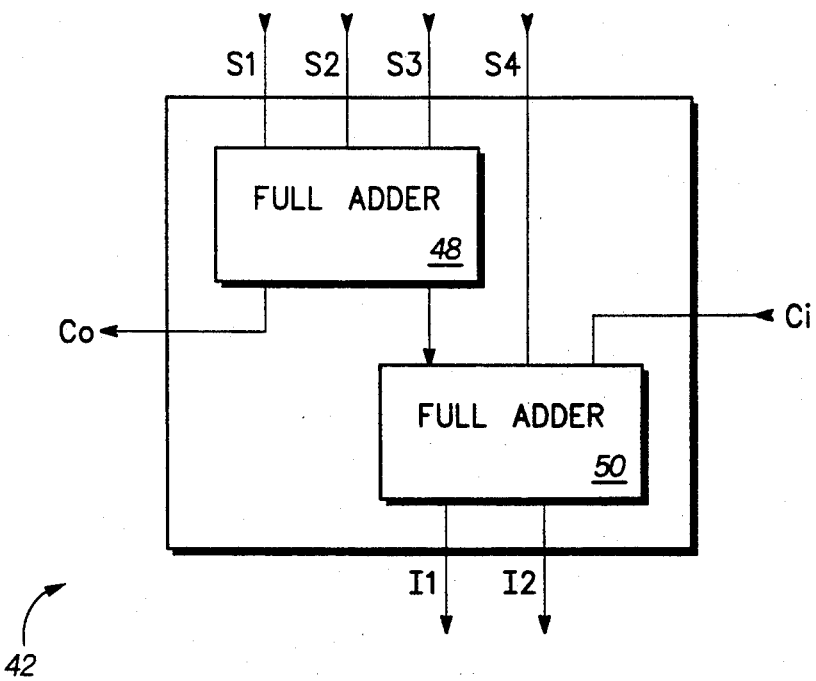
FIG. 1A illustrates a format for recoding a signed multiplier operand using Modified Booth's algorithm.
FIG. 1B illustrates a format for recoding an unsigned multiplier operand using Modified Booth's algorithm.
FIG. 3 illustrates in a block diagram form a portion of a carry-save adder circuit of FIG. 2.

In FIG. 1A, each bit of the signed multiplier operand is underlined and respectively labelled "1" through "15." The sixteenth bit is labelled "S" to indicate that it is a sign bit of the multiplier operand. A value of the sign bit is extended and, therefore, no more information is needed to characterize the signed multiplier operand. Additionally, to insure that each segment of the multiplier operand has three bits, a zero is placed to the right of bit 1. The signed multiplier operand is segmented into eight sections respectively labelled "#1" through "#8," where section #1 includes the added zero, bit 1 and bit 2. Similarly, section #2 includes bits 2 through 4 and, in general, for N between 3 and 7 inclusive, a section labelled #N includes bits (2N−1) through (2N+1). Finally, section #8 includes bit 14, bit 15, and the S bit. Each section overlaps the previous section as determined by the Modified Booth's algorithm which requires that a series of bits of the multiplier operand be examined to form the recoded values. Although the multiplier operand illustrated in FIG. 1A has a length of sixteen bits, the recoding segmentation described herein may be expanded to multiplier operands with any number of bits.

In FIG. 1B, the format for recoding an unsigned multiplier operand is illustrated. Similarly, each bit of the unsigned multiplier operand is underlined and respectively labelled "1" through "16." To further characterize the series of bits of the unsigned multiplier operand, a first zero is placed to the left of bit 16 and a second zero is placed to the right of bit 1. Additionally, to insure that each segment of the unsigned multiplier operand has three bits, a third zero is inserted to the right the second zero. Because of the added zeroes, the unsigned multiplier operand must be segmented into nine sections rather than eight sections as was the case for the signed multiplier operand. Each of the five sections is respectively labelled "#0" through "#8." Section #0 includes the second and third zeroes and bit 1, section #1 has bit 1 through bit 3, section #2 has bit 3 through bit 5 and, in general, for N between 3 and 7 inclusive, a section labelled #N includes bits (2N−1) through (2N+1). Additionally, section #8 includes bit 14, bit 15, and a first zero placed after bit 16.

In the implementation of the invention described herein, segment #0 of the recoded unsigned multiplier operand is processed differently than the remaining segments. Therefore, because the number of remaining segments is an even power of two, the multiplication procedure may be efficiently executed by an iterative multiplier circuit having a binary summation tree circuit. When a number of segments is an even power of two, the binary summation tree circuit allows for both a symmetrical layout and a reduction of the number of components which would have typically been required for an unsigned multiplication operation.

Figure 2:
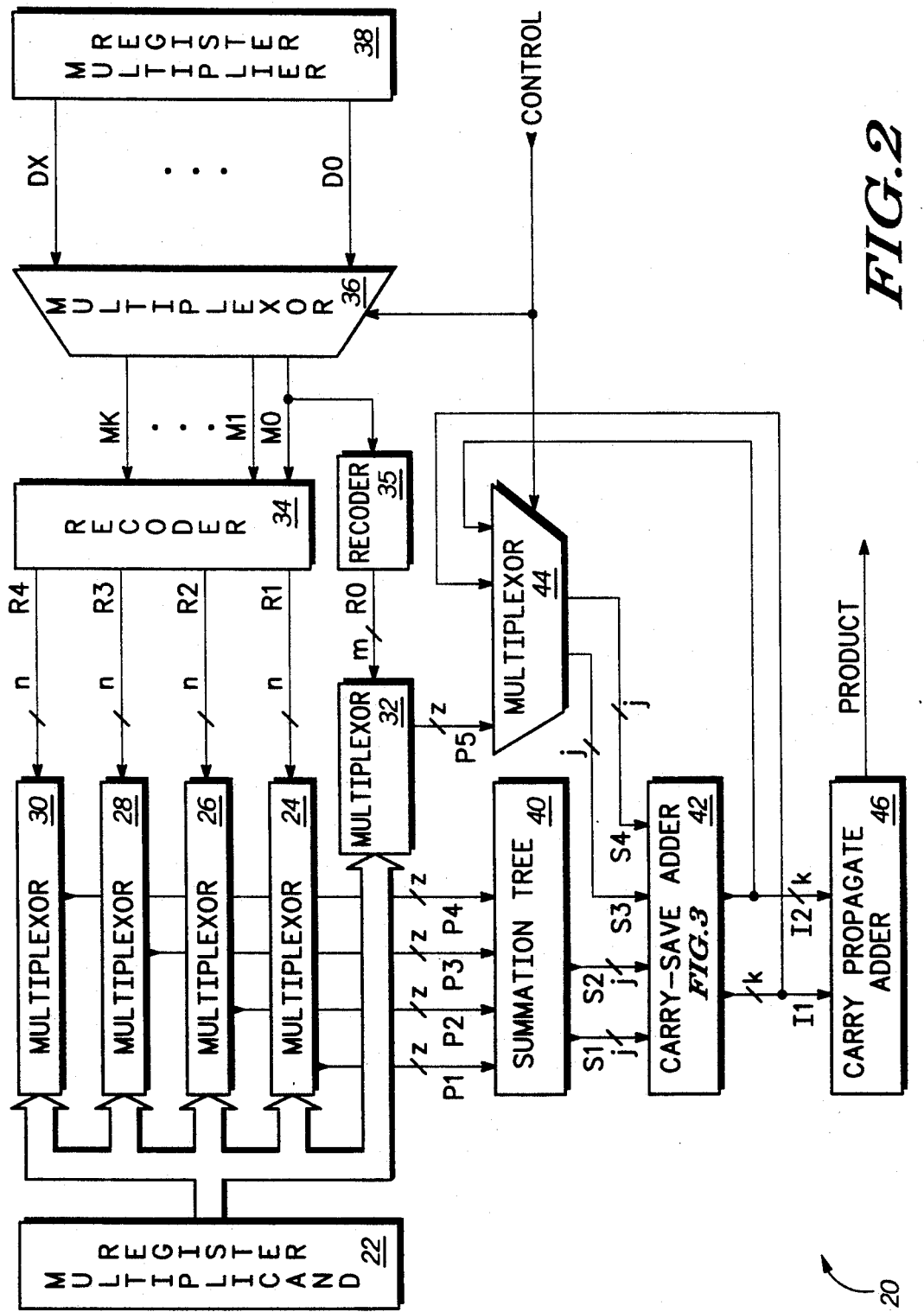
FIG. 2 illustrates in a block diagram form a recoded iterative multiplier in accordance with the present invention.

Illustrated in FIG. 2 is a recoded iterative multiplier 20 in accordance with the present invention. The multiplier 20 generally includes a multiplicand register 22, a multiplexor 24, a multiplexor 26, a multiplexor 28, a multiplexor 30, a multiplexor 32, a recoder circuit 34, a recoder 35, a multiplexor 36, a multiplier register 38, a binary summation tree 40, a carry-save adder 42, a multiplexor 44, and a carry propagate adder 46.

Multiplicand register 22 is coupled to a data input of each of multiplexor 22, multiplexor 24, multiplexor 26, multiplexor 28, multiplexor 30, and multiplexor 32 to provide a multiplicand operand to each multiplexor. Similarly, multiplier register 38 has a plurality of output signals respectively labelled "DO" through "DX," where X is an integer. The plurality of output signals is coupled to multiplexor 36 to provide the multiplier operand. Multiplexor 36 is coupled to recoder 34 to provide a plurality of output signals respectively labelled "MO" through "MK," where K is typically an integral divisor of X. Recoder 34 then provides a plurality of recoded signals respectively labelled "R1" through "R4." Each of the R1 through R4 signals has n bits, where n is an integer value which is dependent on a type of recoding algorithm implemented by recoder 34. Each of the outputs of recoder 34 is connected to a control input of one of multiplexor 24, multiplexor 26, multiplexor 28, and multiplexor 30. Additionally, multiplexor 36 is coupled to recoder 35 to provide the MO output signal which is m bits wide, where m is an integer. Recoder 35 then provides an n bit wide recoded signal labelled "RO." The RO signal is connected to a control input of multiplexor 32.

Although the implementation of the invention illustrated in FIG. 2 has four multiplexors, more multiplexors may be implemented. In general, recoder 34 should provide a plurality of Y control signals to a corresponding plurality of multiplexors. Y is typically an integer value equal to (X+1) divided by 2(K+1).

Multiplexor 24 provides a signal labelled "P1." Similarly, multiplexor 26 provides a signal labelled "P2," multiplexor 28 provides a signal labelled "P3," and multiplexor 30 provides a signal labelled "P4." Each of the outputs of multiplexor 24, multiplexor 26, multiplexor 28, and multiplexor 30 is z bits wide, where z is an integer, and is connected to a respective one of a plurality of data inputs of binary summation tree 40. A binary summation tree is typically comprised of a plurality of adder circuits (not illustrated) arranged in a symmetrical circuit layout. For example, a conventional binary summation tree which is commonly known in the art is a Wallace tree.

A first output of binary summation tree 40 is connected to a first input of carry-save adder 42 to provide a signal labelled "S1" of bit width j, where j is an integer. Similarly, a second output of binary summation tree 40 is connected to a second input of carry-save adder 42 to provide a signal labelled "S2", also of bit width j. A first output of carry-save adder 42 is labelled "I1" and is of bit width k, where k is an integer. The I1 signal is connected to both a first input of multiplexor 44 and a first input of carry propagate adder 46. A second output of carry-save adder 42 is labelled "I2" and is also k bits wide. The I2 signal is connected to both a second input of multiplexor 44 and a second input of carry propagate adder 46. An output of carry propagate adder 46 provides a signal labelled "Product."

Additionally, multiplexor 32 is connected to a third data input of multiplexor 44 to provide a signal labelled "P5". However, multiplexor 32 only provides the P5 signal during a first iteration of a multiplication operation. An external controlling circuit (not illustrated) is coupled to multiplexor 44 to provide a signal labelled "Control." Multiplexor 44 provides a first and a second signal respectively labelled "S3" and "S4" via a first and a second output. The first and second outputs of multiplexor 44 are respectively connected to a third and a fourth input of carry-save adder 42.

A portion of one possible implementation of carry-save adder 42 of FIG. 2 is illustrated in greater detail in FIG. 3. A carry-save adder generally includes a plurality of full adders configured in a predetermined manner, although a more symmetrical circuit implementation is also possible. In FIG. 3, a first portion of carry-save adder 42 corresponds to a least significant bit of a plurality of bits which form the entire carry-save adder 42. The first portion of carry-save adder 42 includes a first full adder 48 and a second full adder 50. A plurality of remaining portions (not illustrated) of the carry-save adder 42 is implemented similarly, but corresponds to more significant bits of the plurality of bits which form the entire carry-save adder 42. In the first portion of carry-save adder 42, the S1, S2, and S3 signals each provide a data value to one of a plurality of inputs of full adder 48. A sum output of full adder 48 is connected to an input of full adder 50, and a carry output of full adder 48 provides a signal labelled "Co." Similarly, the S4 signal provides a data value to a second input of full adder 50, and a signal labelled "Ci" provides a carry value to a carry input of full adder 50. Full adder 50 provides a first and a second output respectively labelled "I1" and "I2." The Co signal output from full adder 48 is provided to the carry input of a full adder (not shown) similar to full adder 50 in a next most significant bit of the plurality of bits which form the entire carry-save adder 42. In the least significant bit of carry-save adder 42, the Ci signal is a logic zero.

Referring to FIG. 2, during an unsigned multiplication operation, a multiplicand operand is provided to multiplicand register 22. At a predetermined point in time, the multiplicand operand is provided to and temporarily stored in each of multiplexor 24, multiplexor 26, multiplexor 28, multiplexor 30, and multiplexor 32.

When the multiplicand is provided to multiplicand register 22, a multiplier operand is concurrently provided to multiplier register 38. Multiplier register 38 provides each bit of the multiplier operand to one of the plurality of inputs of multiplexor 36. Each bit is respectively labelled "DO" through "DX," where DO is a value of a first bit of the multiplier operand and DX is a value of a last bit of the multiplier operand. Each of the bits provided to multiplexor 36 is latched and temporarily stored. At a first predetermined point in time, an external controlling circuit (not illustrated) enables multiplexor 36 to provide each bit of a first portion of the multiplier operand to recoder 34 in parallel via the plurality of MO through MK signals. Additionally, the MO signal is also provided to recoder 35. At a second predetermined point in time, the controlling circuit enables multiplexor 36 to provide each bit of a second portion of the multiplier operand to recoder 34 via the plurality of MO through MK signals. Generally, the first portion of the multiplier operand corresponds to a less significant portion of the multiplier operand and the second portion of the multiplier operand corresponds to a more significant portion of the multiplier operand.

Recoder 34 samples each of the plurality of MO through MK signals to provide recoded control signals which are n bits wide, where n is an integer. Recoder 35 samples only the MO signal to provide the recoded RO signal. During a first iteration, the MO signal corresponds to bit 1 of the segmented multiplier operand illustrated in FIG. 1B. The recoded control signals indicate a predetermined operation which should be performed on the operand to generate a predetermined partial product in accordance with Modified Booth's algorithm. During the first iteration of the multiplication operation, recoder 34 examines the unsigned multiplier and segments the multiplier into sections as was previously described in connection with FIG. 1B. Each of the sections is then examined to provide a respective control signal to indicate which predetermined operation should be performed. Table 1 is provided below to illustrate the encoding of each section as specified by Modified Booth's algorithm.

TABLE 1

| $M_{i+1}$ | $M_i$ | $M_{i-1}$ | i-th Partial Product |
|---|---|---|---|
| 0 | 0 | 0 | 0 |
| 0 | 0 | 1 | Z |
| 0 | 1 | 0 | Z |
| 0 | 1 | 1 | 2Z |
| 1 | 0 | 0 | −2Z |
| 1 | 0 | 1 | −Z |
| 1 | 1 | 0 | −Z |
| 1 | 1 | 1 | 0 |

In Table 1, "i", which is an integer, referes to the bit of the multiplier operand and "Z" refers to the entire multiplicand operand. As an example of the encoding specified by Modified Booth's algorithm, a multiplier operand section with a value of 011 would result in the multiplicand operand being multiplied by positive two.

Recoder 34 uses Modified Booth's algorithm to provide the plurality of control signals labelled R1 through R4. Similarly, recoder 35 uses the Modified Booth's algorithm to provide the control signal labelled R0. In the implementation of the invention described herein, the first portion of the multiplier operand has eight bits which are respectively segmented by recoders 34 and 35 into five sections. The five sections respectively correspond to sections #0 through #4 of the unsigned multiplier as illustrated in FIG. 1B. Recoder 34 processes each one of the four sections to respectively provide one of the plurality of control signals R1 through R4. For example, section #4 which includes bit 9, bit 8 and bit 7 is encoded to form signal R4. Similarly, section #3 is encoded to form signal R3, section #2 is encoded to form signal R2, and section #1 is encoded to form signal R1.

Each of the plurality of control signals is provided by recoder 34 to a control input of a respective one of multiplexors 24, 26, 28, and 30. Multiplexors 24, 26, 28, and 30 are implemented in a conventional manner such that each is able to perform both an inversion and a shift of information stored therein. For example, if any one of multiplexors 24, 26, 28, and 30 shifts information to the left by a single bit, a result of the shift is effectively the information multiplied by two. Therefore, multiplexors 24, 26, 28, and 30 process the multiplicand operand to generate a plurality of partial products associated with Modified Booth's algorithm.

The R1 signal is provided to multiplexor 24 to generate a first partial product, P1. The R1 signal enables multiplexor 24 to perform an operation specified by the Modified Booth's algorithm to provide P1. For example, the R1 signal indicates that the multiplicand should be multiplied by either zero, a positive or negative one, or a positive or negative two to form the first partial product, P1. As previously discussed, if the R1 signal indicates that the multiplicand should be multiplied by two, multiplexor 24 is enabled to shift the multiplicand to the left by a single bit. Similarly, the R2 signal is provided to multiplexor 26 to generate a second partial product, P2, the R3 signal is provided to multiplexor 28 to generate a third partial product, P3, and the R4 signal is provided to multiplexor 30 to generate a fourth partial product, P4. Each one of the partial products, P1 through P4, is provided to a predetermined one of the plurality of inputs of binary summation tree 40.

Recoder 35 provides the R0 signal to multiplexor 32 to generate a fifth partial product labelled P5. The R0 signal provides control signals necessary to enable multiplexor 32 to provide the fifth partial product to multiplexor 44. Again, multiplexor 32 is implemented in a conventional manner to perform both an inversion and a shift of information stored therein. As previously discussed, if information is shifted to the left by a single bit, a result of the shift is effectively the information multiplied by two. In the implementation described herein, the fifth partial product is determined by the M0 signal, which corresponds to bit #1 of FIG. 1B. In accordance with the recoding rules provided in Table 1, if the M0 signal is zero, a resultant partial product is also zero. In a similar manner, if the M0 signal is one, the resultant partial product is $-2z$, where z is the entire multiplicand operand. The recording for this partial product is generally accomplished more easily than other information values processed by recoder 34. Therefore, generation of the P5 partial product signal may be accomplished by less complex circuitry than is required for multiplexors 34, 26, 28, and 30. Recoder 35 and multiplexor 32 are active only during the first iteration of a multiple iteration multiplication operation.

Because an integral power of two partial products is provided to binary summation tree 40, the binary summation tree 40 is implemented using a symmetrical circuit layout such as a Wallace tree. The Wallace tree is explained in further detail in an article written by Shlomo Waser and published in *IEEE COMPUTERS* in Oct. 1975. The article is entitled "High-Speed Monolithic Multipliers for Real-Time Digital Signal Processing." Binary summation tree 40 processes each of the partial products, P1 through P4, to provide two signals respectively labelled S1 and S2 to carry-save adder 42.

Concurrently, the Control signal is asserted to enable multiplexor 44 to provide the fifth partial product to additional inputs of carry-save adder 42. The outputs of multiplexor 44 are labelled S3 and S4, respectively. Therefore, the fifth partial product is added to the two signals provided by binary summation tree 40 in carry-save adder 42, rather than being processed by binary summation tree 40.

At a predetermined point in time, carry-save adder 42 processes the S1, S2, S3, and S4 signals to provide two outputs respectively labelled I1 and I2 to carry propagate adder 46. The two outputs I1 and I2 are provided to both multiplexor 44 and carry propagate adder 46 until a second iteration of the multiplication operation is executed. Multiplexor 44 stores the two outputs, I1 and I2, which contain a first portion of the multiplication product.

During a second iteration of the multiplication operation, the multiplier operand stored in multiplier register 38 is again provided to multiplexor 36. Multiplier register 38 provides each bit of a second portion of the multiplier operand to multiplexor 36, where each bit is latched and temporarily stored. Subsequently, multiplexor 36 provides the second portion of the multiplier operand consisting of the upper order bits in parallel to recoder 34. The second portion of the multiplier operand is a high order byte of the multiplier operand in the implementation of the invention described herein. In the second iteration, the high order byte of the multiplier operand is sectioned into four segments corresponding to segments #5, #6, #7, and #8 of FIG. 1B. At a predetermined point in time, the second portion of the multiplicand operand is provided to and temporarily stored in each of multiplexor 24, multiplexor 26, multiplexor 28, multiplexor 30, and multiplexor 32.

Recoder 34 manipulates each bit to provide recorded control signals to indicate a predetermined operation which should be performed on the multiplicand operand. The predetermined operation is used to generate a second portion of a multiplication product in accordance with Modified Booth's algorithm. To determine which operation should be performed, recoder 34 segments the upper portion of the unsigned multiplier operand into four sections as was previously discussed. Each of the sections is then examined to provide a respective one of the control signals, R1 through R4, in accordance with the recording illustrated in Table 1. Specifically, bits from group #5 of FIG. 1B are recorded to form the R1 signal. Similarly, bits from group #6 generate the R2 signal, bits from group #7 generate the R3 signal, and bits from group #8 generate the R4 signal using recoder 34.

As was previously described, each of the plurality of control signals is provided to a control input of a respective one of multiplexors 24, 26, 28, and 30. The R1 signal is provided to multiplexor 24 to generate a first partial product, P1. The R1 signal enables multiplexor 24 to perform an operation specified by the Modified Booth's algorithm to provide P1. For example, the R1 signal indicates that the multiplicand should be multiplied by either zero, a positive or negative one, or a positive or negative two to form the first partial product, P1. Similarly, the R2 signal is provided to multiplexor 26 to generate a second partial product, P2, the R3 signal is provided to multiplexor 28 to generate a third partial product, P3, and the R4 signal is provided to multiplexor 30 to generate a fourth partial product, P4. Each of the partial products, P1 through P4, is provided to a predetermined one of the plurality of inputs of binary summation tree 40.

Recorder 35 provides the R0 signal to multiplexor 32 to generate the fifth partial product labelled P5. In the second iteration of the multiplication operation, the R0 signal enables multiplexor 32 to provide the fifth partial product to multiplexor 44. A value of the fifth partial product is not pertinent to the result of the multiplication operation during the second iteration as will be discussed later.

Binary summation tree 40 processes each of the partial products provided therein to provide two signals respectively labelled S1 and S2 to carry-save adder 42. Concurrently, the Control signal is asserted to enable multiplexor 44 to provide the first portion of the multiplication product stored therein from the first iteration of the multiplication operation to additional inputs of carry-save adder 42.

At a predetermined point in time, carry-save adder 42 processes the S1, S2, S3, and S4 signals to provide two outputs respectively labelled I1 and I2 to both multiplexor 44 and to carry propagate adder 46. Carry propagate adder 46 subsequently manipulates I1 and I2 to provide the product of the multiplication operation via the Product signal. The Product signal is provided to an external user of the recoded iterative multiplier 20 described herein.

In the implementation of the invention described herein, there has been provided a recoded iterative multiplier 20 which uses Modified Booth's algorithm to perform an unsigned multiplication operation quickly without the added circuitry typically required by conventional multiplier implementations. During the first iteration of the multiplication operation, multiplexor 44 is used to store the additional partial product typically generated during an unsigned multiplication operation. The partial product is then added to the result provided by binary summation tree 40 in carry-save adder 42, rather than in the binary summation tree 40 as is generally done. During the second and any subsequent iterations, multiplexor 44 is used to select the previously accumulated partial product provided by signals I1 and I2 in order to provide this partial result to carry-save adder 42 for accumulation. Therefore, the first portion of the multiplication product is generated without the addition of asymmetrical circuitry in binary summation tree 40. Additionally, because binary summation tree 40 is implemented symmetrically, an iterative multiplication operation is also used. Therefore, the unsigned multiplication operation is accomplished quickly with minimum amount of added circuitry.

The implementations of the invention described herein are provided by way of example only, however, and many other implementations may exist for executing the function described herein. For example, binary summation tree 40 may be implemented using a series of carry-save adders. Additionally, carry-save adder 42 may be implemented in a variety of ways. The block diagram illustrated in FIG. 3 is provided by way of example only. Additionally, multiplier circuit 20 may be integrated in any data processing system in which a multiplication operation is performed. Recoders 34 and 35 may also be implemented using conventional logic circuitry to perform the Modified Booth's algorithm. As well, although the operation described herein multiplies operands which are sixteen bits long, longer operands might also be used with the addition of a small amount of circuitry or with additional iterations.

Additionally, recoded iterative multiplier 20 could be used to provide an addend for a multiplication operation in a single step. For example, assume that a word length of the operands is such that there are sufficient inputs to binary summation tree 40 to process all partial products generated by multiplexors 24, 26, 28, 30, and 32 without unduly affecting the size or speed of binary summation tree 40. Conventionally, in this situation, signals S3 and S4 are forced to have zero values by multiplexor 44 during the first iteration of the multiplication operation. If a user of multiplier 20 determined that a predetermined data value should be added to the result of the multiplication operation, as would be the case in either a multiply-accumulate or a fused multiply-add operation, the predetermined data value could be provided to multiplexor 44. At a predetermined time, the Control signal would enable multiplexor 44 to provide the predetermined data value to carry-save adder 42 during a first iteration, where the predetermined data value and the result of the multiplication operation would be added.

To perform the operation described above, the user of the multiplier 20 would be required to provide external inputs to multiplexor 44 to receive the predetermined data value.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A recoded iterative multiplier, comprising:
   a first input means for receiving and storing a multiplier operand, the first input means selectively providing only portions of the multiplier operand at any one point in time;
   a recoder coupled to the first input means, the recoder receiving a predetermined portion of the multiplier operand and providing a plurality of recoded control signals in accordance with a predetermined recoding algorithm;
   a second input means for receiving and providing a multiplicand operand;
   partial product generation means coupled to the second input means and the recoder for providing a plurality of summands by shifting and selectively negating the multiplicand operand a predetermined number of bit positions in response to the recoded control signals;
   means for reducing a first portion of the plurality of summands to a smaller number of summands, the means for reducing coupled to the partial product generation means for receiving the first portion of the plurality of summands;
   means for combining the smaller number of summands with two input signals to provide two intermediate summands;
   means for selecting either a second portion of the plurality of summands when expressed in a redundant form or the two intermediate summands as an output, the means for selecting coupled to the means for combining for providing the output as the two input signals; and output adder means coupled to the means for combining for receiving the two intermediate summands and adding the two intermediate summands to provide an output product.

2. The multiplier of claim 1 wherein the predetermined recoding algorithm is Modified Booth's algorithm.

3. The multiplier of claim 1 wherein the multiplier operand is an unsigned operand.

4. The multiplier of claim 1 wherein the means for reducing the plurality of summands is a plurality of arithmetic circuits forming a summation tree having a symmetrical circuit layout.

5. The multiplier of claim 4 wherein the summation tree is comprised of a plurality of carry-save adders.

6. A method for implementing a recoded iterative multiplier, comprising the steps of:

providing a first input means for receiving and storing a multiplier operand, the first input means selectively providing only portions of the multiplier operand at any one point in time;

coupling a recoder to the first input means, the recoder receiving a predetermined portion of the multiplier operand and providing a plurality of recoded control signals in accordance with a predetermined recoding algorithm;

providing a second input means for receiving and providing a multiplicand operand;

coupling a partial product generation means to the second input means and the recoder for providing a plurality of summands by shifting and selectively negating the multiplicand operand a predetermined number of bit positions in response to the recoded control signals;

coupling a means for reducing to the partial product generation means for receiving a first portion of the plurality of summands, the means for reducing reducing the first portion of the plurality of summands to a smaller number of summands;

providing a means for combining the smaller number of summands with two input signals to provide two intermediate summands;

providing a means for selecting either a second portion of the plurality of summands when expressed in a redundant form or the two intermediate summands as an output, the means for selecting coupled to the means for combining for providing the output as the two input signals; and coupling an output adder means to the means for combining for receiving the two intermediate summands and adding the two intermediate summands to provide an output product.

7. The method of claim 6 wherein the step of providing a plurality of recoded control signals is in accordance with Modified Booth's algorithm.

8. The method of claim 6 wherein the first input means receives and stores an unsigned multiplier operand.

9. The method of claim 6 wherein the first input means selectively provides a low order portion of the multiplier operand at a first predetermined point in time and provides a high order portion of the multiplier operand at a second predetermined point in time.

10. A recoded iterative multiplier, comprising:

a first input means for receiving and storing a multiplier operand, the first input means selectively providing only portions of the multiplier operand at any one point in time;

a recoder coupled to the first input means, the recoder receiving the multiplier operand and providing a plurality of recoded control signals in accordance with a Modified Booth's recoding algorithm;

a second input means for receiving and providing a multiplicand operand;

a plurality of multiplexors each coupled to the second input means and the recoder, each of the plurality of multiplexors providing a plurality of summands by shifting and selectively negating the multiplicand operand a predetermined number of bit positions in response to the recoded control signals;

a summation tree coupled to the plurality of multiplexors for receiving a first portion of the plurality of summands, the summation tree reducing the first portion of the plurality of summands to a smaller number of summands;

means for combining the smaller number of summands with two input signals to provide two intermediate summands;

means for selecting either a second portion of the plurality of summands when expressed in a redundant form or the two intermediate summands as an output, the means for selecting coupled to the means for combining for providing the output as the two input signals; and output adder means coupled to the means for combining for receiving the two intermediate summands and adding the two intermediate summands to provide an output product.

11. The multiplier of claim 10 wherein the multiplier operand is an unsigned operand.

12. The multiplier of claim 10 wherein the summation tree is comprised of a plurality of carry-save adders.

* * * * *

UNITED STATES PATENT AND TRADEMARK OFFICE
CERTIFICATE OF CORRECTION

PATENT NO. : 5,220,525

DATED : June 15, 1993

INVENTOR(S) : William C. Anderson, et al.

It is certified that error appears in the above-identified patent and that said Letters Patent is hereby corrected as shown below:

Column 11, line 40, after "for" delete [reducing]

Signed and Sealed this

Third Day of May, 1994

Attest:

BRUCE LEHMAN

Attesting Officer　　Commissioner of Patents and Trademarks